UNITED STATES PATENT OFFICE 2,827,438
Patented Mar. 18, 1958

2,827,438

HEAT STORAGE MEDIA

Robert D. Broadley, New York, N. Y., and Robert V. Townend, Morristown, N. J., assignors to Allied Chemical & Dye Corporation, New York, N. Y., a corporation of New York No Drawing. Application January 4, 1954
Serial No. 402,152

4 Claims. (Cl. 252—70)

The present invention relates to heat storage media and to a method of transferring heat to and from the same.

It has heretofore been proposed to effect storage of heat in crystalline hydrates of certain salts which, during absorption of heat from a heat source of higher temperature, undergo change from solid crystalline to liquid solution state. In a general sense, the change of state occurs upon absorption of heat quantity equal to the heat of separation of the hydrate from solution. Upon exposure to surroundings at lower temperature, heat flows from the solution and the latter undergoes recrystallization wholly or in part to solid hydrate form. Heat storage within and release of stored heat from such crystalline hydrate-solution systems, taking place consecutively or cyclically, has been proposed for maintenance of closely controlled heat exchanger temperatures, for heating interiors of buildings after absorption of solar heat and in numerous other circumstances where relatively large quantities of available stored heat at controlled, usually relatively low, temperatures are desired.

Salt hydrates which are well adapted for use as heat storage and transfer media by means of reversible change from solid hydrate to solution forms (hereinafter termed "transition") should meet the following specifications:

(1) The transition temperature should be well defined, complete or substantially complete change of state in either direction being effected at a single temperature or within a predetermined and preferably narrow range of temperature.

(2) In a solid crystalline form, the system should contain enough water of crystallization which is released during the heat absorption phase to dissolve completely the dehydrated form of the salt.

(3) The solid crystal-liquid system should undergo transition easily and substantially completely, and should be substantially free of metastable characteristics resulting in supercooling of solution or crystallization of crystal species other than the desired hydrate.

Many salts which form crystalline hydrates having otherwise desirable properties for heat storage purposes have been, at best, only partially satisfactory, and, in some instances, totally impractical for use because of their normal tendency to form supercooled solutions during release of stored heat. Thus, in practice the transition temperature is that at which the supercooled solution crystallizes i. e. at a temperature below that at which the higher hydrate crystallizes. The systems which are of high potential value for heat storage and release purposes, from the standpoint of quantity of heat available from a unit of weight or volume, are usually those in which the salt forms high hydrates, that is, in crystalline form contain a relatively large number of chemically combined molecules of water for each molecule of anhydrous salt. Systems containing such salts when undergoing the undesired supercooling often tend to form, upon release of heat of fusion, one or more relatively stable crystalline hydrates containing a number of molecules of water intermediate between the number found within the desired high hydrate and the number, if any, combined with the dehydrated form. Formation of the intermediate hydrates or supercooling without crystallization not only substantially reduces the heat storage capacity of the system, but often tends to destroy the value of the system for release or absorption of heat at predetermined closely controlled temperature.

A system of disodium phosphate ($Na_2HPO_4$) and its hydrates is typical of salt systems which have been proposed. This salt forms a dodecahydrate $$Na_2HPO_4 \cdot 12H_2O$$

which contains 60.4% of water and 39.6% of the anhydrous disodium phosphate. During dehydration it absorbs about 114 B. t. u. per pound of mixture (i. e. dodecahydrate) while being converted to the corresponding relatively stable dihydrate ($Na_2HPO_4 \cdot 2H_2O$), releasing enough water as such, completely to dissolve the dihydrate. In attempts to use this salt for storage and release of heat, it has been found, however, that during release of the stored heat, i. e. during its transition from solution to crystal form, the solution tends to supercool and form crystals of an intermediate relatively stable hydrate, disodium phosphate heptahydrate $$Na_2HPO_4 \cdot 7H_2O$$

with attendant release of only 54 B. t. u. per pound. Thus, the desired release and transfer of latent heat of fusion is not fully realized.

One object of this invention is elimination of metastable conditions within heat storage systems comprising water and disodium phosphate. A second object is realization of increased heat storage capacity and efficiency during practical use of heat storage systems of the type described. Other objects will be apparent from the description which follows.

It has been unexpectedly discovered that if amorphous or graphitic carbon is present with and preferably within a solution of disodium phosphate, the system will repeatedly be reversible and easily undergo transition to high hydrate form upon release of heat and to solution form upon absorption of heat without formation of undesirable intermediate hydrates or of metastable systems. The transition also takes place within a predetermined reproducible close range of temperature. Accordingly, the invention in certain of its aspects comprises formation of heat storage media containing water, disodium phosphate, and amorphous or graphitic carbon. Preferably the pH is adjusted by addition of a suitable substance, if necessary, to a value within the range of 8.3 to 9.6.

In practice of the invention, the presence of relatively small quantities of carbon will suffice, for example quantities as low as 0.1 part by weight of carbon per 100 parts of anhydrous disodium phosphate have been found to function effectively. Although the carbon may be present in amounts up to 50 parts by weight, preferably about 1 to 2 parts by weight of this substance per one hundred parts by weight of the salt may be employed. Typical forms of amorphous or graphitic carbon (hereinafter both referred to generically as carbon) include bone charcoal, coke, carbon black, wood charcoal, oil-free lamp black, and graphite of a size suitable for easily effected distribution or suspension within the system. The carbon may be present in part at least as a predeposited coating on the walls of the vessel containing the heat transfer medium. Preferably, however, it is at least in part distributed throughout the same.

The desired amount of carbon may be incorporated within the system by its addition to the anhydrous or a lower hydrate form of the salt when in solution in a quantity of water sufficient that a predominating proportion, preferably substantially all, of the anhydrous or lower hydrate solute will combine therewith to form the desired higher hydrate. Alternatively, the desired quantity of carbon may be mechanically mixed with the desired higher hydrate when the latter is in finely divided solid crystalline form, followed by heating to or somewhat above its transition temperature to complete incorporation of the carbon with the salt.

In the form in which the new heat transfer media of the invention appear as reservoirs of releasable heat, they are solutions of disodium phosphate in water the pH of which has been preferably modified and to which carbon has been added. The quantity of water is preferably substantially that which, upon release of the heat of hydration of the higher hydrate, will combine with the lower hydrate to form substantially only the crystalline solid form of the desired higher hydrate. Somewhat lower quantities of water than that indicated may be used if desired, in which event the system containing the carbon, after its transition following release of all available heat of hydration, will be a solid mixture of the desired higher hydrate and of the dehydrated compound. Alternatively, somewhat higher than the theoretical quantities of water indicated may be used, in which event, after the system has released available heat of hydration, it will be in the form of a slurry of crystals of higher hydrate in water solution of the compound. Through control of the quantity of excess water used, the consistency of the slurry may be regulated so as to maintain desired fluidity or consistency for its movement as by pumping to and from the heat source and heat sink.

It has been found that heat absorption and release by aqueous solutions of disodium phosphate in the presence of carbon may be realized in accordance with this invention to fullest extent and within narrow temperature limits, if the pH of the mixture is generally within the range of 8.3 to 9.6 preferably 9.2 to 9.6, say 9.25. In this region of pH, the possibility of supercooling which may occur at lower pH, and the possibility of precipitation of undesirable crystal species with attendant evolution of lesser amounts of heat which may occur at higher pH are both virtually eliminated.

The pH of the disodium phosphate solution may be controlled if desired by addition thereto of e. g. trisodium phosphate $Na_3PO_4$, sodium hydroxide NaOH, or sodium carbonate $Na_2CO_3$, the first of these being preferred. Especially effective results are found to occur when the amount of trisodium phosphate in the solution is from about 11.0 to about 46.2 parts by weight, say about 14.5 parts, per one hundred parts by weight of $Na_2HPO_4$. As the amount rises from 11.0 to 46.2, the pH rises within the preferred range from 9.2 to 9.6, and absorption and liberation of heat with attendant controlled phase change readily occur without the difficulties above-noted.

As typical of the novel heat storage systems with which the invention is concerned there may be mentioned solutions of disodium phosphate or of its dihydrate, containing dispersed therein 0.1 to 50, for example 2 parts by weight of carbon per 100 parts by weight of anhydrous disodium phosphate.

In practice, the amount of water present may be from about 150 to about 260 parts by weight per 100 parts by weight of disodium phosphate, expressive as anhydrous salt. Preferred concentration is at least about 169 parts of water. The composition may be a slurry when the amount of water is above 200 parts. Such a medium is capable of and does, upon being subjected repeatedly to ambient temperatures respectively above and below about 75° F., absorb and release heat which is substantially the theoretical latent heat of hydration of the dissolved dihydrate to the crystalline dodecahydrate, i. e. 114 B. t. u. per pound expressed on a basis of the hydrated dodecahydrate $Na_2HPO_4 \cdot 12H_2O$, the reversible change taking place entirely within the predetermined range of about 75° F. to about 96° F.

For example, when serving as a heat source for interiors of buildings, one or more tanks of this medium may be installed in the walls of a dwelling and subjected, alternatively, to cooling and heating, as during the daytime exposing it to sunlight, and during the ensuing hours of darkness, permitting flow of the heat so stored into the dwelling interior as the latter cools. If, however, it is desired, after exposure of the heat storage medium to a relatively high temperature source of heat at say 125° to 200° F. to effect its release at the location other than the heat source, the quantity of water employed in forming the solution of the phosphate may be increased from the theoretical 152 parts required to form the dodecahydrate per 100 parts by weight of anhydrous disodium phosphate to as much as say 260 parts by weight. Then, when transition to the dodecahydrate form is completed, the medium is in the form of a slurry capable of being circulated as by pumping between the higher and lower temperature surroundings.

On a basis of 100 parts by weight of disodium phosphate $Na_2HPO_4$ expressed as anhydrous compound, the preferred maximum and minimum limits and a typical value of the relative amounts by weight of the other various components in typical mixtures may be as follows:

| Component | Minimum | Maximum | Typical |
| --- | --- | --- | --- |
| Water | 150 | 260 | 174 |
| Carbon | 0.1 | 50 | 1 |
| Trisodium phosphate | 11.0 | 46.2 | 14.5 |

According to one particular example of this invention, one hundred parts by weight of anhydrous disodium phosphate were dissolved within a container in 188 parts by weight of water together with 15.2 parts by weight of trisodium phosphate to adjust the pH of the solution to 9.2 to 9.3. To the resultant solution, 2 parts by weight of powdered amorphous carbon (Baker & Adamson bone charcoal) was added. After stirring thoroughly to distribute the charcoal throughout the solution, the container was immersed in hot water and heated to about 125° F. or somewhat above, say 160° F. and, after being maintained at that temperature for one or two hours, was cooled until solid by immersion of the container in a heat absorbing environment or sink such as a container of ice. The heat transfer medium resulting from this procedure contained carbon distributed throughout apparently dry solid, which was substantially entirely disodium phosphate dodecahydrate ($Na_2HPO_4 \cdot 12H_2O$). Upon repeated heating and cooling so that the medium underwent a series of cycles of transition from solid to complete liquid and back again, it was found that the transition took place substantially completely within the sharply defined temperature range of 75° F. to 96° F. During fusion or liquefaction, and during the subsequent crystallization or solidification, the heat absorption and release was measured and determined to be an average of about 114 B. t. u. per pound on the basis of the dodecahydrate salt.

It will be understood that the heat transfer media to which the invention is directed may be used to absorb and release heat while being subjected to changes in temperature over a range extending on either or both sides of its theoretical transition point in order to utilize, where constant temperatures of the medium are not necessary, the mass of solid or liquid, as the case may be, for storage and release of sensible heat.

Whereas this invention has been particularly described with reference to certain specific embodiments thereof, it will be apparent to those skilled in the art that certain feature may be modified without departing from the scope of the invention as set forth in the claims appended hereto. In the claims, the term "disodium phosphate" is intended to designate the anhydrous compound, and the term "carbon" is intended to designate material selected from the group consisting of amorphous or graphitic carbon as hereinbefore defined.

We claim:

1. A heat storage medium which reversibly acquires substantial content of solid crystalline disodium phosphate dodecahydrate and assumes substantially completely liquid solution form within a predetermined, reproducible range of transition temperature respectively upon release of heat therefrom and absorption of heat therein consisting essential of one hundred parts by weight of disodium phosphate, water in amount from 150 to 260 parts by weight, trisodium phosphate sufficient to bring the resulting mixture to pH of 8.3 to 9.6 and carbon in amount less than 50 parts by weight.

2. A heat storage medium which reversibly acquires substantial content of solid crystalline disodium phosphate dodecahydrate and assumes substantially completely liquid solution form within a predetermined, reproducible range of transition temperature respectively upon release of heat therefrom and absorption of heat therein consisting essentially of one hundred parts by weight of disodium phosphate, water in amount from 150 to 260 parts by weight, trisodium phosphate sufficient to bring the resulting mixture to pH of 9.2 to 9.6, and carbon in amount less than 50 parts by weight.

3. A heat storage medium which reversibly acquires substantial content of solid crystalline disodium phosphate dodecahydrate and assumes substantially completely liquid solution form within a predetermined, reproducible range of transition temperature respectively upon release of heat therefrom and absorption of heat therein consisting essentially of one hundred parts by weight of disodium phosphate, with water, carbon, and trisodium phosphate in the proportion by weight of each as set forth in the following table:

| Component | Minimum | Maximum |
| --- | --- | --- |
| Water | 150 | 260 |
| Carbon | 0.1 | 50 |
| Trisodium phosphate | 11.0 | 46.2 |

4. A crystalline heat transfer medium containing disodium phosphate dodecahydrate consisting essentially of the following components in the indicated proportions by weight:

| | |
| --- | --- |
| Disodium phosphate | 100 |
| Water | 174 |
| Carbon | 1 |
| Trisodium phosphate | 14.5 |

References Cited in the file of this patent

UNITED STATES PATENTS

| | | |
| --- | --- | --- |
| 1,787,888 | White et al. | Jan. 6, 1931 |
| 2,089,467 | Chamberlain | Aug. 10, 1937 |
| 2,355,146 | Carney | Aug. 4, 1944 |
| 2,515,298 | Feldman | July 18, 1950 |
| 2,677,243 | Telkes | May 4, 1954 |
| 2,677,367 | Telkes | May 4, 1954 |

OTHER REFERENCES

Jones: "Inorganic Chemistry" (1947), pub. by The Blakiston Co., Philadelphia, pages 196–197.

U. S. DEPARTMENT OF COMMERCE

PATENT OFFICE

CERTIFICATE OF CORRECTION

Patent No. 2,827,438  Robert D. Broadley et al.      March 18, 1958

It is hereby certified that error appears in the printed specification of the above numbered patent requiring correction and that the said Letters Patent should read as corrected below.

Column 4, line 1, for "aheat" read --a heat--; line 71, for "feature" read --features--; column 5, line 10, for "essential" read --essentially--.

Signed and sealed this 1st day of July 1958.

(SEAL)
Attest:

KARL H. AXLINE
Attesting Officer

ROBERT C. WATSON
Commissioner of Patents